June 27, 1944.  C. H. JOHNSON  2,352,202
MIXING PLANT
Filed Sept. 18, 1941   3 Sheets-Sheet 1

INVENTOR
Charles H. Johnson
By Parker, Carlson, Pitzner & Hubbard
ATTORNEYS

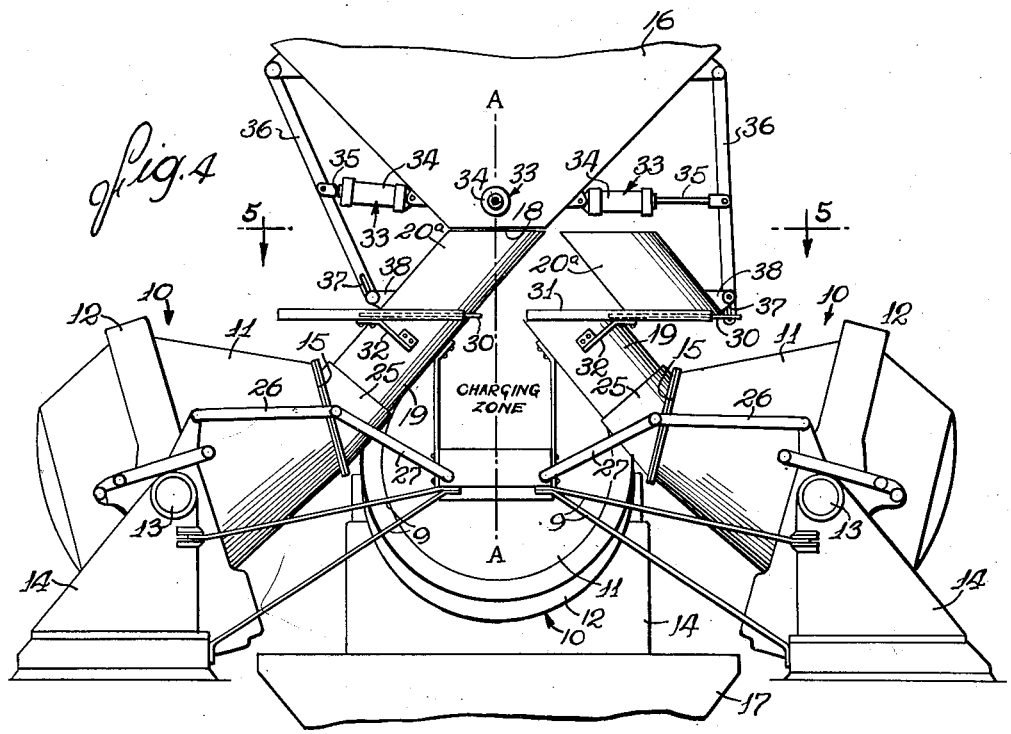
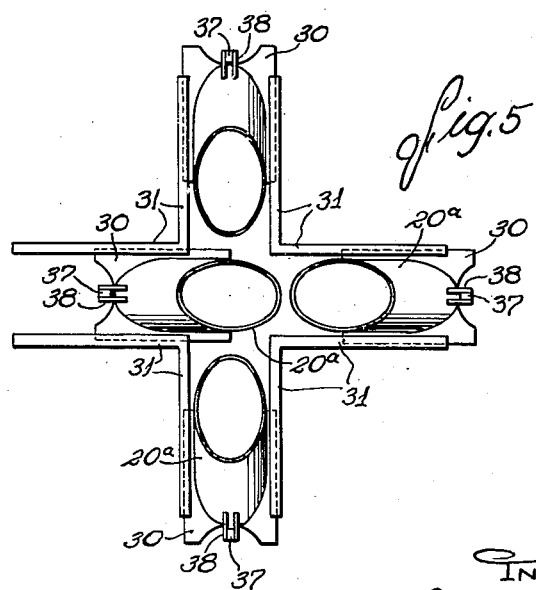

June 27, 1944. C. H. JOHNSON 2,352,202
MIXING PLANT
Filed Sept. 18, 1941 3 Sheets-Sheet 3
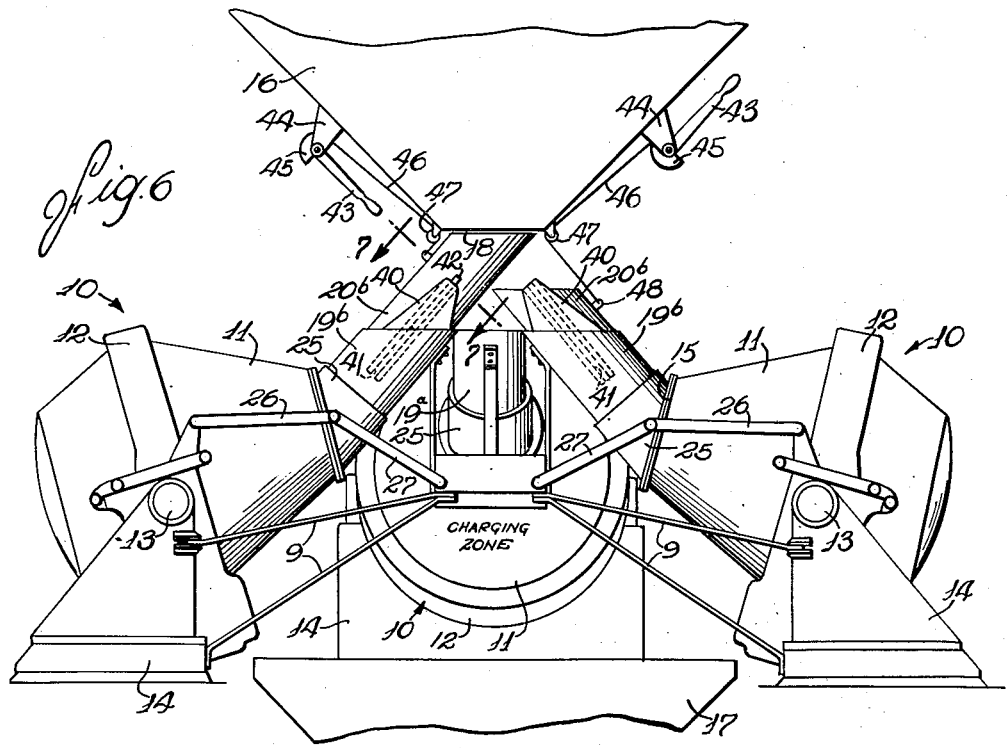
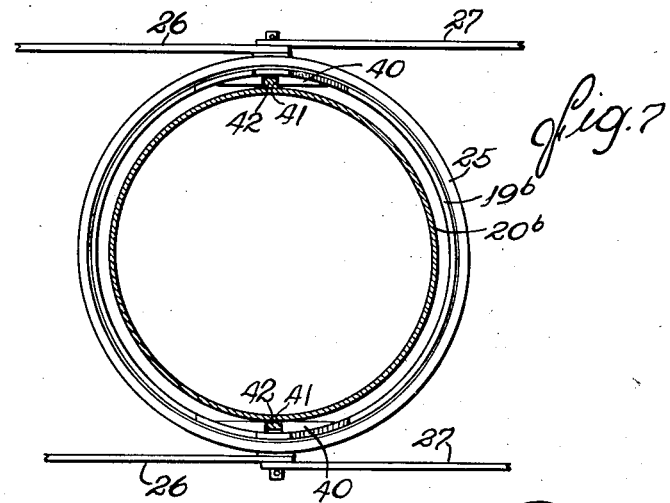
INVENTOR
Charles H. Johnson
By Parker, Carlson, Pitzner & Hubbard
ATTORNEYS Patented June 27, 1944

2,352,202

UNITED STATES PATENT OFFICE 2,352,202

MIXING PLANT

Charles H. Johnson, Champaign, Ill., assignor to The C. S. Johnson Company, Champaign, Ill., a corporation of Illinois Application September 18, 1941, Serial No. 411,361

10 Claims. (Cl. 259—152)

The present invention relates to mixing plants for concrete, and more particularly to improvements in mixing plants of the so-called concentric zone type.

Generally stated, the object of the present invention is to provide a concentric zone mixing plant comprising a plurality of mixers and a single collecting hopper or the like for receiving aggregates which are to be charged into the mixers, together with a novel and improved arrangement of chutes for charging the materials from the collecting hopper into a selected one of the several mixers.

More particularly, it is an object of the invention to provide in a concentric zone mixing plant, a novel charging chute arrangement affording full selectivity for charging desired ones of several mixers, one after another, from a single aggregate collecting hopper, in which the charging is effected by a very fast gravity chuting of the material, and in which the chute arrangement is extremely rugged and well adapted to withstand the severe pounding of the tons of rock and the like that pour through the chutes during use.

Further objects and advantages of the invention will become apparent as the following description proceeds taken in connection with the accompanying drawings, in which:

Fig. 4 is a side elevation, similar to Fig. 1, of a modified mixing plant embodying the invention.

Fig. 5 is a detail sectional view, taken substantially along the line 5—5 in Fig. 4, showing particularly the selectively operable intermediate charging chutes.

Fig. 6 is a side elevation, similar to Fig. 1, showing still another modified form of mixing plant embodying the invention.

Fig. 7 is an enlarged transverse sectional view taken substantially along the line 7—7 in Fig. 6.

Figure 1:
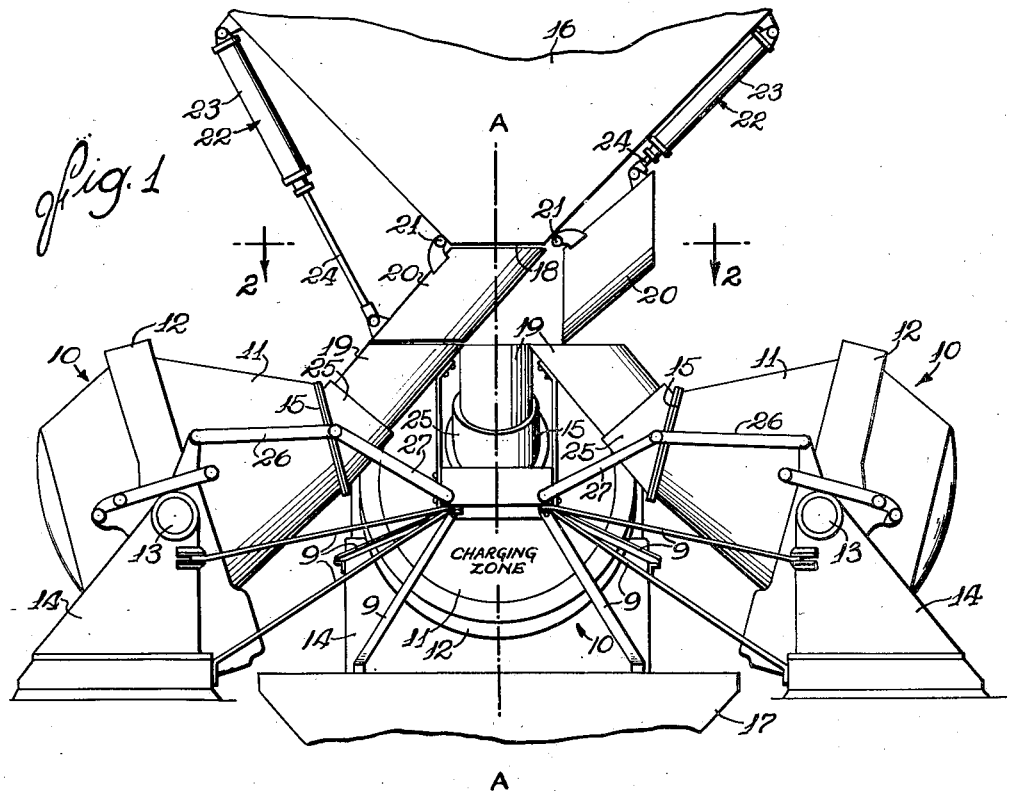
Figure 1 is a front elevation of a concentric zone mixing plant embodying the invention, only three of the four mixers contemplated being shown and the fourth, which would be the one nearest the observer, being omitted to make plain the arrangement of the centrally located parts.

While the invention is susceptible of various modifications and alternative constructions, I have shown in the drawings and will herein describe in detail certain preferred embodiments, but it is to be understood that I do not thereby intend to limit the invention to the specific forms or structures disclosed, but intend to cover all modifications and alternative constructions falling within the spirit and scope of the invention as expressed in the appended claims.

Figure 2:
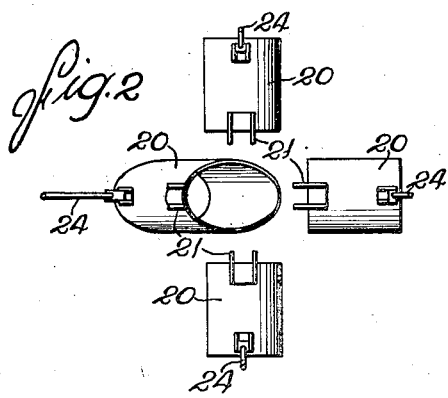
Fig. 2 is a detail sectional view, taken substantially along the line 2—2 of Fig. 1, showing particularly the selectively operable intermediate charging chutes, by means of which selective charging of the mixers is accomplished.
Figure 3:
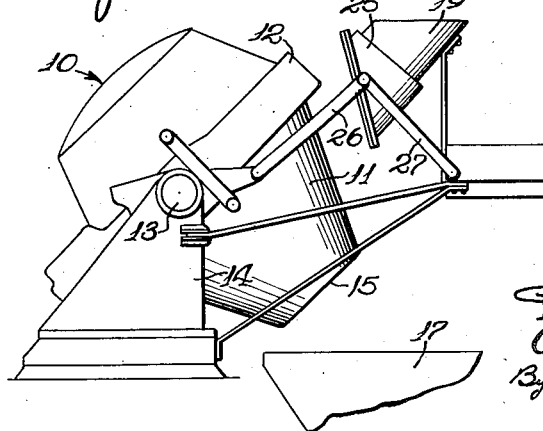
Fig. 3 is a side elevation of one of the mixers included in the plan of Fig. 1, showing the same in its discharging position.

Referring now to the first exemplary embodiment of my invention, herein illustrated in Figs. 1, 2 and 3, it will be seen that the installation there shown comprises a plurality or battery of mixers 10 disposed in a common horizontal plane and all facing inwardly toward the vertical central axis A—A of a central space or "charging zone." The mixers have been shown as equally spaced with respect to each other and, in this case, located at intervals of about ninety degrees from each other about the axis, since four mixers are contemplated for the present set-up (three of which appear in Fig. 1). These mixers are themselves of conventional and well-known form, each comprising a mixing drum 11 revolubly mounted in a cradle 12 which is tiltable on trunnions 13 journaled in a base 14. The mixers have been shown as being of the tilting variety of front-charged, front-discharged type, and have in their inner or forward ends circular openings at 15 through which aggregates are charged preparatory to mixing, and later discharged from the drum after mixing. During charging and mixing the drums 11 occupy the generally upwardly tilted position shown in Fig. 1 and during discharge they are tilted downward to the position shown in Fig. 3 so that their contents will slide out by gravity.

A collecting hopper 16 and a receiving hopper 17 (Fig. 1) are disposed respectively above and below the "charging zone" and are located generally concentrically with respect to the central axis A—A. The collecting hopper 16 is of inverted cone shape and serves to receive aggregates or dry constituents of the cement mix, such as sand, gravel, crushed rock, dry cement, etc., which are fed to it by the usual batching devices (not shown) such as automatic batch weighers. This collecting hopper 16 terminates in a round outlet opening at 18 in its lower end. The other hopper, namely the receiving hopper 17, has a large open top into which the various mixers 10 can readily discharge and it may terminate in any suitable form of outlet (not shown) in its lower end for feeding its contents into a conveyor or other desired receptacle.

In accordance with the present invention, a novel and improved chute arrangement has been provided for selectively directing the aggregates from the collecting hopper 16 to any desired one of the several mixers 10 for charging the latter. In the exemplary construction shown in Fig. 1, the system of chutes includes a plurality of stationary chutes 19, one for each of the mixers 10. These stationary chutes may be mounted in any suitable manner, as for example, on the head of a tripod 9 whose legs project outward beyond the periphery of the receiving hopper 17. Each of the chutes 19 is tubular in form, being cylindrical in cross-section in the present instance. The lower ends of the stationary chutes 19 terminate adjacent the charging openings 15 of the respective mixers so as to direct aggregates into the same, while the upper ends of the several chutes 19 are open and all terminate in a common horizontal plane located a substantial distance below the level of the collecting hopper outlet 18.

Coacting with the stationary chutes 19 is a corresponding series of movable intermediate chutes 20 (Figs. 1 and 2). These intermediate chutes match in cross-section the stationary chutes 19 and each of them is shaped and dimensioned to connect the upper end of its corresponding stationary chute to the outlet 18 of the collecting hopper 16. The four intermediate chutes 20 are pivotally mounted, as indicated at 21, on the exterior of the collecting hopper 16 and at equally spaced points about the latter's periphery.

Upon reference to Fig. 1, it will be seen that the lefthand one of the intermediate chutes 20 there shown is located in its operative or charging position and in which its upper end registers with the collecting hopper outlet 18, while its lower end registers with the mating upper end of its stationary chute 19. The other three intermediate chutes 20 are all shown in their retracted or inoperative positions (see also Fig. 2). The retracted or inoperative position for the intermediate chutes is exemplified by the position of the righthand one of the chutes 20 in Fig. 1. When the chutes 20 are in their retracted positions they are clear of the outlet 18 of the collecting hopper so that any one of the other intermediate chutes can be readily swung into its charging position. It will be observed that advantage has been taken of the inverted conical or pyramidal shape of the collecting hopper in locating the intermediate chutes. By pivoting them as shown, they can be swung into the clearance space beneath the sloping side of the collecting hopper to retract such chutes and thus readily place them out of the way while they are inoperative. In view of the fact that the upper ends of the intermediate chutes 20 are elliptical in outline (see Fig. 2), the diameter of the discharge opening 18 of the collecting hopper is made of a diameter substantially equal to the length of the minor axis of the elliptical open upper ends of the intermediate chutes.

Any suitable manual or power operated means may be provided for shifting the intermediate chutes 20 into and out of operative or charging position. In Fig. 1 this means has been illustrated in the form of pneumatic actuators 22 comprising cylinders 23, pivoted at their upper ends on the collecting hopper, and in which are slidable pistons 24, pivotally connected at their lower ends to the respective chutes 20. Pressure fluid for operating the various actuators may be supplied in any suitable manner.

To couple the lower ends of the stationary chutes 19 with the openings 15 of their respective mixer drums, retractable snout chutes 25 are utilized (Figs. 1 and 3). The particular snout chutes 25 illustrated are loosely telescoped on the lower ends of the stationary chutes 19 and are adapted to slide axially along the latter. Each of the snout chutes 25 has pivoted on it a pair of links 26 and 27. The outer ends of the links 26 are pivotally connected to the mixer cradles 12 while the opposite ends of the links 27 are pivotally connected to the head of the tripod 9. When the mixers 10 are tilted upwardly into their charging positions shown in Fig. 1, the linkages 26, 27 are distended as there shown, thereby pulling the retractable snout chutes 25 downward, to the positions shown, so that they couple the stationary chutes 19 to the noses of the mixer drums. On the other hand, when the mixers 10 are tilted downward, to the discharge positions shown in Fig. 3, the linkages 26, 27 are partially collapsed, thereby sliding the snout chutes 25 axially upward along the stationary chutes 19 a sufficient distance that the nose of the mixer clears the retractable snout chutes.

The operation of the mixing plant shown in Figs. 1 and 3 will, in general, be clear from the foregoing. By way of resume, it may be noted that suitably proportioned aggregates are fed into the collecting hopper 16. From this hopper 16 the aggregates are fed to any desired one of the several mixers 10 by manipulation of the selection type chute mechanism described. For example, if it is desired to charge the lefthand one of the mixers 10 shown in Fig. 1, its corresponding intermediate chute 20 is swung downward and inward into its charging position shown in Fig. 1, the other three intermediate chutes 20 being maintained in their retracted positions so that they are clear of the hopper outlet 18. The aggregates thus flow by gravity from the collecting hopper 16 through the alined chutes 20 and 19 into the lefthand mixer 10.

Thereafter the intermediate chute 20 for this mixer is retracted and that of another mixer swung down into charging position. While the latter mixer is being charged, the aggregates previously charged into the lefthand one of the mixers, as described, is mixed by revolving the drum 11. In this way each of the mixers can be charged, one after another, with predetermined batches of material from the collecting hopper 16. After the mixing operation is completed, the mixer is tilted downward and the mix is discharged by gravity from it into the receiving hopper 17.

From the foregoing it will be seen that full selectivity of operation is afforded. In other words, any desired one of the several mixers can be charged from the single collecting hopper. Furthermore, the chute arrangement, through the medium of which this selective type of operation is accomplished, directs the aggregates at a steep angle downward from the collecting hopper into the selected mixer so that the charging operation is extremely rapid and there is no danger of clogging the chutes. Moreover, the chute structure is extremely rugged and particularly suited to the use of strongly reinforced parts so that it can withstand the severe pounding incident to conveying literally tons of rock and gravel moving at high speed. It will be appreciated by those skilled in the art that mixing plants of this kind are commonly used in installations where large amounts of mixed concrete are required, as for example, in the erection of dams and the like, and that the individual mixers may require several cubic yards of aggregate for each charge of the same.

In Figs. 4 and 5 a modified form of concentric zone mixing plant has been illustrated, which also embodies the invention. This modified plant differs from that of Figs. 1 to 3 described above only in that a somewhat different arrangement for selectively shifting the intermediate chutes into and out of charging position has been provided. Consequently, duplicate parts have been designated by the same reference numerals and a detailed description of the same need not be repeated. In this instance four intermediate chutes 20ª are provided, identical in shape and size with the intermediate chutes 20 heretofore described in connection with Fig. 1, but the intermediate chutes 20ª are arranged to be moved horizontally into and out of charging position rather than being swung or pivoted into and out of such position.

To accommodate such horizontal movement of the intermediate chutes 20ª, they are mounted on corresponding slides 30. Each of these slides 30 is movable horizontally in a pair of opposed guideways of channel-shaped cross-section on one of the four arms of a cruciform frame 31 and which guideways receive the side edges of the slides. The frame 31 is mounted by brackets 32 on the stationary chutes 19. The several slides 30 have apertures therein registering with the lower ends of the intermediate chutes 20ª which they carry.

Upon reference to Figs. 4 and 5, it will be seen that the slides 30 are movable on the framework 31 in directions radial of the vertical axis A—A, so that their intermediate chutes 20ª can be moved individually into and out of charging position. The lefthand chute 20ª in Fig. 4 is shown in its charging position and in that position its upper end registers with the collecting hopper outlet 18 and its lower end registers with the open upper end of its corresponding stationary chute 19. When the intermediate chutes 20ª are in their retracted positions (see for example the other three of these chutes in Fig. 5) they are clear of the collecting hopper outlet.

Pneumatic actuators 33 (Fig. 4) may be utilized for moving the slides 30. For this purpose each of the actuators comprises a cylinder 34 pivoted to the collecting hopper 16 and a piston 35 pivotally connected to the intermediate portion of a link 36. The upper ends of these latter links are pivotally connected to the upper portion of the collecting hopper, while their lower ends have pin-and-slot type lost-motion connections 37 with brackets 38 fixed to the outer ends of the associated slides 30. Thus, when the piston 35 is retracted within its cylinder 34, the corresponding link 36 is swung inward, to the position illustrated by the lefthand link in Fig. 4, so that the slide 30 is drawn inward and the intermediate chute 20ª on it moved into its charging position. Similarly, when one of the pistons 35 is moved outward with respect to its cylinder 34, the corresponding link 36 is swung outward, to the position illustrated by the righthand link in Fig. 5, thereby withdrawing its slide 30 and intermediate chute 20ª to clear the collecting hopper outlet.

A second modified form of mixing plant, embodying the invention, is shown in Figs. 6 and 7. Again, the arrangement is substantially like that of Fig. 1 except that a different construction and arrangement for moving the selectively available intermediate chutes has been provided. The remaining parts, which duplicate those previously described, have been given the same reference numerals and their individual construction need not be repeated.

In the plant of Figs. 6 and 7 the stationary chutes 19ᵇ correspond to the stationary chutes 19 heretofore described, while the intermediate chutes 20ᵇ correspond to the previously described intermediate chutes 20. In the present construction the intermediate chutes are arranged to telescope within the stationary chutes and to move axially with respect thereto in being shifted into and out of charging position. In order to guide the intermediate chutes 20ᵇ for such axial sliding movement, reinforced guide plates 40 are fixed in opposite sides of the stationary chutes 19ᵇ and have longitudinally extending grooves 41 therein. Complemental longitudinally extending ribs 42, fixed on the opposite sides of the intermediate chutes 20ᵇ (see Fig. 7), are received in these grooves.

Any suitable means may be provided for moving individual ones of the intermediate chutes 20ᵇ into and out of their charging positions. In Fig. 6 this means has been indicated as comprising hand levers 43 pivoted on brackets 44 fixed on the exterior of the collecting hopper 16. These hand levers have arcuate members 45 on their inner ends over which are led cables 46 that are anchored to the upper ends of such members. These cables pass over pulleys 47 and are fastened to the respective intermediate chutes as indicated at 48. Upon pulling down on the lefthand one of the levers 43 shown in Fig. 6 the cable 46 is drawn upward, thereby pulling the associated intermediate chute 20ᵇ upward into its charging position shown in Fig. 6. In such charging position the upper end of the intermediate chute registers with the collecting hopper outlet 18 and directs aggregates from it down into the corresponding stationary chute 19ᵇ. Release of the hand lever 43 permits the intermediate chute to slide down by gravity, within its associated stationary chute 19ᵇ, into its inoperative or withdrawn position in which it is clear of the collecting hopper outlet.

I claim as my invention:

1. A concrete mixing plant comprising, in combination, a plurality of mixers arranged in a common plane about a central charging zone and having charging and discharging openings therein facing inwardly toward said zone, a collecting hopper for aggregates and a receiving hopper for finished mixes located substantially concentric with the central vertical axis of said charging zone, said receiving hopper being disposed below the plane of said mixers to receive the mixes discharged therefrom and said collecting hopper being disposed above said mixers, said collecting hopper having a single outlet in its lower portion substantially concentric with said vertical axis of the charging zone, a plurality of charging chutes stationarily mounted in said charging zone and leading upwardly from the charging openings of respective ones of said mixers toward said axis, a plurality of intermediate chutes, one for each charging chute, means supporting said intermediate chutes for individual movement independently of each other into and out of charging positions therefor and in which the intermediate chute which is in such charging position connects the outlet of said collecting hopper to the stationary charging chute corresponding to such intermediate chute, whereby aggregates from the hopper may be chuted by gravity from said collecting hopper to the corresponding selected mixer.

2. A concrete mixing plant comprising, in combination, a plurality of mixers each having a charging opening therein and all disposed with said openings facing generally inward toward a common center, a collecting hopper for aggregates having a single outlet in its lower portion and located above said mixers, a plurality of stationary charging chutes leading upward and inward from points adjacent the charging openings of corresponding ones of said mixers to points located at a level below said hopper outlet, a plurality of intermediate chutes, one for each stationary chute, means movably supporting said intermediate chutes for individual movement of each of the same independently of each other into and out of a charging position therefor in which its upper end registers with said hopper outlet and its lower end registers with the upper end of its corresponding stationary chute, and means for selectively shifting said intermediate chutes into and out of said charging positions therefor.

3. A concrete mixing plant comprising, in combination, a plurality of mixers each having a charging opening therein and all disposed with said openings facing generally inward toward a common center, a collecting hopper for aggregates having a single outlet in its lower portion and disposed above said mixers, a plurality of stationary charging chutes leading upward from points adjacent the charging openings of corresponding ones of said mixers to points below said hopper outlet, a plurality of intermediate chutes, one for each stationary chute, means supporting said intermediate chutes in respective retracted positions therefor in which all of the same are clear of said hopper outlet, and means for moving selected individual ones of said intermediate chutes from said retracted positions therefor into operative positions therefor in which the selected intermediate chute connects said hopper outlet to the corresponding stationary chute.

4. A concrete mixing plant comprising, in combination, a plurality of mixers each having a charging opening therein and all disposed with said openings facing generally inward toward a common center, a collecting hopper for aggregates having a single outlet in its lower portion and disposed above said mixers, a plurality of generally tubular stationary charging chutes leading upwardly and inwardly from points adjacent the charging openings of corresponding ones of said mixers and all terminating in open upper ends lying in a common horizontal plane below said hopper outlet, a plurality of intermediate chutes corresponding in number to said stationary charging chutes, said intermediate chutes also being of generally tubular form and corresponding in cross-section to their associated stationary chutes, means movably supporting said intermediate chutes for individual movement of each of the same independently of the others into and out of a charging position therefor in which its upper end registers with said hopper outlet and its lower end with the upper end of its corresponding stationary chute.

5. A concrete mixing plant comprising, in combination, a plurality of mixers each having a charging opening therein and all disposed with said openings facing generally inward toward a common center, a collecting hopper for aggregates having a single outlet in its lower portion and disposed above said mixers, a plurality of stationary charging chutes leading upwardly and inwardly from points adjacent the charging openings of corresponding ones of said mixers and terminating in open upper ends lying in a common horizontal plane spaced below said hopper outlet, a plurality of intermediate chutes each dimensioned to extend from said hopper outlet to the open upper end of its corresponding stationary chute, means supporting said intermediate chutes for individual swinging movement from an inoperative position in which it is displaced clear of said hopper outlet to a charging position in which its upper end registers with said hopper outlet and its lower end registers with the open upper end of its corresponding stationary chute, and means for selectively shifting desired ones of said intermediate chutes from their inoperative to their charging positions and vice versa.

6. A concrete mixing plant comprising, in combination, a plurality of mixers, each having a charging opening therein and all disposed with said openings facing generally inward toward a common center, a collecting hopper of generally inverted cone shape for aggregates having a single outlet in its lower end and disposed above said mixers, a plurality of stationary charging chutes leading upward from points adjacent the charging openings of corresponding ones of said mixers to points below said hopper outlet, a plurality of intermediate chutes pivotally mounted on the lower end portion of said collecting hopper and each swingable from a retracted inoperative position in which it lies along the exterior of the collecting hopper and clear of the hopper outlet to an operative charging position in which its upper end registers with said hopper outlet and its lower end registers with the upper end of the corresponding stationary chute.

7. A concrete mixing plant comprising, in combination, a plurality of mixers, each having a charging opening therein and all disposed with said openings facing generally inward toward a common center, a collecting hopper for aggregates having an outlet in its lower portion and disposed about said mixers, a plurality of stationary charging chutes leading upwardly and inwardly from points adjacent the charging openings of corresponding ones of said mixers and all terminating in open upper ends lying substantially in a common plane disposed in spaced relation beneath said hopper outlet, a plurality of intermediate chutes, one for each stationary chute, and each being dimensioned to connect its corresponding stationary chute to the hopper outlet, and means supporting said intermediate chutes for sliding movement in a horizontal direction from inoperative positions therefor in which said intermediate chutes are disposed clear of said hopper outlet to operative or charging positions therefor in which the intermediate chute which is so located connects said hopper outlet to the open upper end of its corresponding stationary chute.

8. A concrete mixing plant comprising, in combination, a plurality of mixers each having a charging opening therein and all disposed with said openings facing generally inward toward a common center, a collecting hopper for aggregates having an outlet in its lower portion and disposed about said mixers, a plurality of stationary charging chutes leading upwardly and inwardly from points adjacent the charging openings of corresponding ones of said mixers and terminating in open upper ends all disposed substantially in a common horizontal plane located in spaced relation beneath said hopper outlet, a horizontal frame disposed adjacent said upper ends of said stationary chutes, a plurality of slides mounted on said frame for individual sliding movement inward toward a vertical central axis passing through said hopper outlet, a plurality of intermediate chutes, one for each stationary chute, fixed on respective ones of said slides and movable therewith, and each of said intermediate chutes being shaped to connect said hopper outlet to the open upper end of the corresponding one of said stationary chutes when the slide carrying such intermediate chute is in its innermost position.

9. A concrete mixing plant comprising, in combination, a plurality of mixers, each having a charging opening therein and all disposed with said openings facing generally inward toward a common center, a collecting hopper for aggregates having an outlet in its lower portion and disposed about said mixers, a plurality of stationary charging chutes of generally tubular form leading upwardly and inwardly from points adjacent the charging openings of corresponding ones of said mixers to points located at a level below said hopper outlet, a plurality of intermediate chutes, also of generally tubular form, and disposed in telescoping relation with corresponding ones of said stationary chutes, and means for sliding any selected one of said intermediate chutes axially with respect to its corresponding stationary chute to position such intermediate chute alternatively either in a charging position in which it registers with said hopper outlet or in an inoperative position in which it is retracted to clear said hopper outlet.

10. In combination, a collecting hopper having a single discharge opening in its lower end portion, a plurality of gravity flow type dispatching chutes each having an open upper end individually registerable with said hopper discharge opening, and means supporting said chutes for individual movement thereof independently of each other from inoperative positions in which said chutes are clear of said hopper discharge opening into operative positions for said chutes in which the latter extend from said hopper discharge opening outwardly and downwardly to spaced points corresponding to the several chutes.

CHARLES H. JOHNSON.